US012311516B2

(12) United States Patent
Singleton

(10) Patent No.: US 12,311,516 B2
(45) Date of Patent: May 27, 2025

(54) STAKE HOLDING TOOL

(71) Applicant: Silt-Saver, Inc., Covington, GA (US)

(72) Inventor: Earl R. Singleton, Oxford, GA (US)

(73) Assignee: Silt-Saver, Inc., Covington, GA (US)

( * ) Notice: Subject to any disclaimer, the term of this patent is extended or adjusted under 35 U.S.C. 154(b) by 797 days.

(21) Appl. No.: 17/538,332

(22) Filed: Nov. 30, 2021

(65) Prior Publication Data

US 2023/0084242 A1 Mar. 16, 2023

Related U.S. Application Data

(63) Continuation of application No. 29/807,492, filed on Sep. 13, 2021.

(51) Int. Cl.
*B25C 3/00* (2006.01)
*E04H 17/26* (2006.01)

(52) U.S. Cl.
CPC ........... *B25C 3/008* (2013.01); *E04H 17/263* (2013.01)

(58) Field of Classification Search
CPC .......... E04H 17/263; B25C 3/008; B25C 9/00
USPC ..................................... 81/44; 294/19.2, 209
See application file for complete search history.

(56) References Cited

U.S. PATENT DOCUMENTS

| | | | | |
|---|---|---|---|---|
| 4,190,118 | A * | 2/1980 | Sweeney | E02D 13/10 403/4 |
| 4,390,050 | A * | 6/1983 | Whitney | B25C 3/006 227/147 |
| D341,537 | S | 11/1993 | Halsey | |
| 6,352,009 | B1 * | 3/2002 | Gaidjiergis | B25C 3/006 7/169 |
| D577,554 | S | 9/2008 | Geisler | |
| 8,292,281 | B1 | 10/2012 | Smith | |
| D715,609 | S | 10/2014 | Mitchell | |
| 9,085,073 | B2 * | 7/2015 | Hossack | B25C 11/00 |
| 9,387,579 | B2 | 7/2016 | Johnson | |
| D838,569 | S | 1/2019 | Halstead | |
| 10,233,668 | B2 * | 3/2019 | Kennemer | B25B 13/50 |
| 2004/0154812 | A1 * | 8/2004 | McDonald | E04H 17/263 173/90 |
| 2009/0044664 | A1 * | 2/2009 | Geisler | B25C 9/00 81/487 |
| 2012/0247060 | A1 * | 10/2012 | Yasher | E04H 17/263 173/132 |
| 2020/0256079 | A1 | 8/2020 | McIntosh | |

FOREIGN PATENT DOCUMENTS

| | | | | |
|---|---|---|---|---|
| GB | 2524543 A | * | 9/2015 | E04H 12/2215 |

* cited by examiner

*Primary Examiner* — Stephen A Vu
(74) *Attorney, Agent, or Firm* — Womble Bond Dickinson (US) LLP

(57) ABSTRACT

A stake holding tool for holding a stake or post for driving into the ground while the person holding the stake is enabled to maintain a safe distance includes a body having a first end at which a head portion is located, and a second end defining a grip for holding the stake holding tool. The head portion includes a striking section that generally includes a resilient material adapted to absorb shock from impacts; and a stake receiving recess configured to receive stakes or posts of various sizes and configurations.

15 Claims, 5 Drawing Sheets

STAKE HOLDING TOOL

CROSS-REFERENCE TO RELATED APPLICATION

This application is a continuation of U.S. Design patent application No. 29/807,492, filed on Sep. 13, 2021.

INCORPORATION BY REFERENCE

The disclosure of U.S. Design patent application No. 29/807,492, filed on Sep. 13, 2021, is hereby incorporated by reference for all purposes as if presented herein in its entirety.

FIELD OF THE TECHNOLOGY

The present disclosure generally relates to installation of supports such as stakes or posts for installation of various types of fencing; and in particular, to a stake holding tool configured to hold and support a stake or post in a desired orientation and at a safe distance as the stake is driven into the ground.

BACKGROUND

During construction of roads, for landscaping applications, and for other building projects, it is common to erect fencing such as silt fencing, wood or chain link fencing, as well as other types of fences or covering materials, to form a permanent or temporary protective barrier. For example, at most construction sites, temporary silt fencing generally can be erected to filter runoff water and prevent silt and debris from entering a storm water drainage system and potentially contaminating lakes and streams. Such fencing typically includes a filter material attached to metal or wooden stakes or poles that are driven into the ground. The posts or stakes generally are driven into the ground using a sledge hammer or mallet, while the user or another person holds the stake in upright and place with their hand. When the hammer, mallet or other driving tool misses the top of the stake, post or other support, or simply glances the top of the stake, post or support, it can impact the hand or arm of the user or person holding the post or stake, which can cause significant crush injuries and lead to significant missed time, and in some cases also can cause splintering or chipping of the stake, post or support, which also can potentially lead to injuries.

Accordingly, it can be seen that a need exists for a tool or device that enables a stake or post to be held in a desired orientation and location for driving the stake or post into the ground while a user or other person holding the stake or post can stay at a safe location so as to substantially avoid and/or minimize potential injury. It is to the foregoing and other related and unrelated problems in the art that present disclosure is directed.

SUMMARY OF THE DISCLOSURE

The present disclosure generally is directed to tools or devices for extending the reach of a worker to enable them to hold posts or stakes used for fencing or other applications at a construction or job site or in landscape operation or other applications while the stake or post is driven into the ground at a specified location, so as to minimize or avoid the potential for injury due to the first worker being impacted with a tool (e.g., a hammer or mallet) used to drive the stake or post into the ground.

In some aspects of the present disclosure, a stake holding tool is provided. In embodiments, the stake holding tool comprises an elongated body including a first end, an intermediate section, and a second end having a gripping portion defined therealong. The stake holding tool further comprises a head coupled to the first end of the body, the head comprising a striking section including a resilient material and configured to overlap past opposite sides of the body; and a socket section coupled to an appropriate side of the first end of the body of the stake holding tool, and comprising a stake holding recess having a series of projections/recesses arranged about a stake receiving opening, wherein the stake holding recess is configured and enabled to receive different configuration and size stakes or posts therein; and wherein when a portion of a stake or post is received within the stake holding recess, the stake or post is held and located at a selected distance from the second end of the elongated body.

In embodiments, the striking section of the stake holding tool will comprise a plate releasibly coupled to the first end of the elongated body; wherein the striking section is replaceable to enable interchanging of different striking sections for use with different material stakes. In some embodiments, the striking section and the socket section of the stake holding tool each comprise at least one plate releasibly attached on opposite sides of the first end of the elongated body. In addition, one or more spacer plates can be inserted between a lower/bottom socket plate, and the body of the stake holding tool, and between an upper or top strike plate and the body of the stake holding tool, to extend a depth of the stake holding recess, and/or for use of different materials of the striking section.

In embodiments of the stake holding tool, the intermediate section of the elongated body comprises an extensible structure. In other embodiments, the intermediate section of the elongated body also can comprise a connecting portion configured to connect an extension piece to the second end of the elongated body; and in some embodiments, the connecting portion can comprise a series of fastener openings configured to receive fasteners therein for connecting the extension piece to the elongated body.

In some other embodiments, the striking section of the stake holding tool can comprise a plate having an upper surface defining a striking area, and wherein the resilient material of the striking section comprises metal, rubber, high density polyethylene, or a combination thereof. In other embodiments, other materials, also can be used.

In aspects, a stake holding tool is provided, comprising an elongated body including at least a first end and an opposing second end spaced a selected distance from the first end by an intermediate portion; a head portion located at the first end of the body and including a strike plate coupled to the first end; and a stake receiving recess defined in at least the first end opposite the strike plate, the stake receiving recess configured for at least partially receiving an end of a stake, wherein the stake receiving recess includes receiving features that are configured for receiving different configurations of the stakes.

In embodiments of the stake holding device, the head portion further comprises a socket section positioned opposite to the strike plate, and wherein the stake receiving recess is defined in the socket section. In some embodiments, the head portion further comprises at least one spacer coupled to the first end of the elongated body and to the strike plate, and wherein the stake receiving recess is further defined in the spacer so as to extend a depth of the stake receiving recess. In embodiments, the receiving features of the stake holding recess comprise a series of recesses arranged at spaced locations about the stake holding recess. In addition, the recesses can be formed or defined between spaced projections or teeth such that the stake receiving recess is adapted to receive the head or upper ends of stakes or posts having a variety of different configurations.

In embodiments, of the stake holding tool, the head portion further comprises a socket section formed at the first end of the body opposite the strike plate, and wherein the strike plate is removeably coupled to the first end of the body so as to be replaceable; wherein the strike plate is replaceable with a strike plate of a different material selected for driving a stake of a selected material.

According to another aspect, method of forming a stake holding tool is provided, comprising obtaining an elongated body including at least a first end and an opposing second end spaced a selected distance from the first end by an intermediate portion; and coupling at least a striking section to the first end of the elongated body to at least partially form a head portion of the stake holding tool; wherein a stake receiving recess is defined in at least the first end for at least partially receiving an end of a stake, and wherein the stake receiving recess includes receiving features that are configured for receiving different configurations of the stakes.

In embodiments, the method further comprises positioning a socket section opposite to the striking section to further form the head portion of the stake holding tool, wherein the stake receiving recess is further defined in the socket section.

In some embodiments, the method further comprises coupling one or more spacers to the first end of the elongated body and to the socket section to further form the head portion of the stake holding tool, wherein the stake receiving recess is further defined in the spacer.

In embodiments, coupling at least the striking section to the first end of the elongated body comprises removably coupling the striking section to the first end of the elongated body with a plurality of fasteners. In some embodiments, the method further comprises placing one or more spacer plates between the first end of the elongated body and the striking section and coupling the striking section to the first end of the elongated with a plurality of fasteners; wherein the one or more spacer plates each include an opening having a configuration substantially similar to the stake receiving recess so as to extend a depth of the stake receiving recess.

In embodiments, the striking section comprises a striking surface and is formed from a first material comprising at least one of a metal, composite, synthetic material, high density polyethylene, rubber, or a combination thereof, and further comprising decoupling the striking section and substituting an additional striking section formed from a second selected material, wherein the second material is different from the first material, and wherein the first and second materials are selected for driving stakes of different materials.

The foregoing and various other aspects, features and components of the stake holding device, and methods of use and embodiments thereof, according to the principles of the present disclosure, will be better understood upon review of the detailed description set forth below, taken in conjunction with the accompanying drawing figures, which are briefly described as follows.

BRIEF DESCRIPTION OF THE DRAWINGS

The accompanying drawings, which are included to provide a further understanding of the embodiments of the present disclosure, are incorporated in and constitute a part of this specification, illustrate embodiments of the invention, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

DETAILED DESCRIPTION

Figure 1:
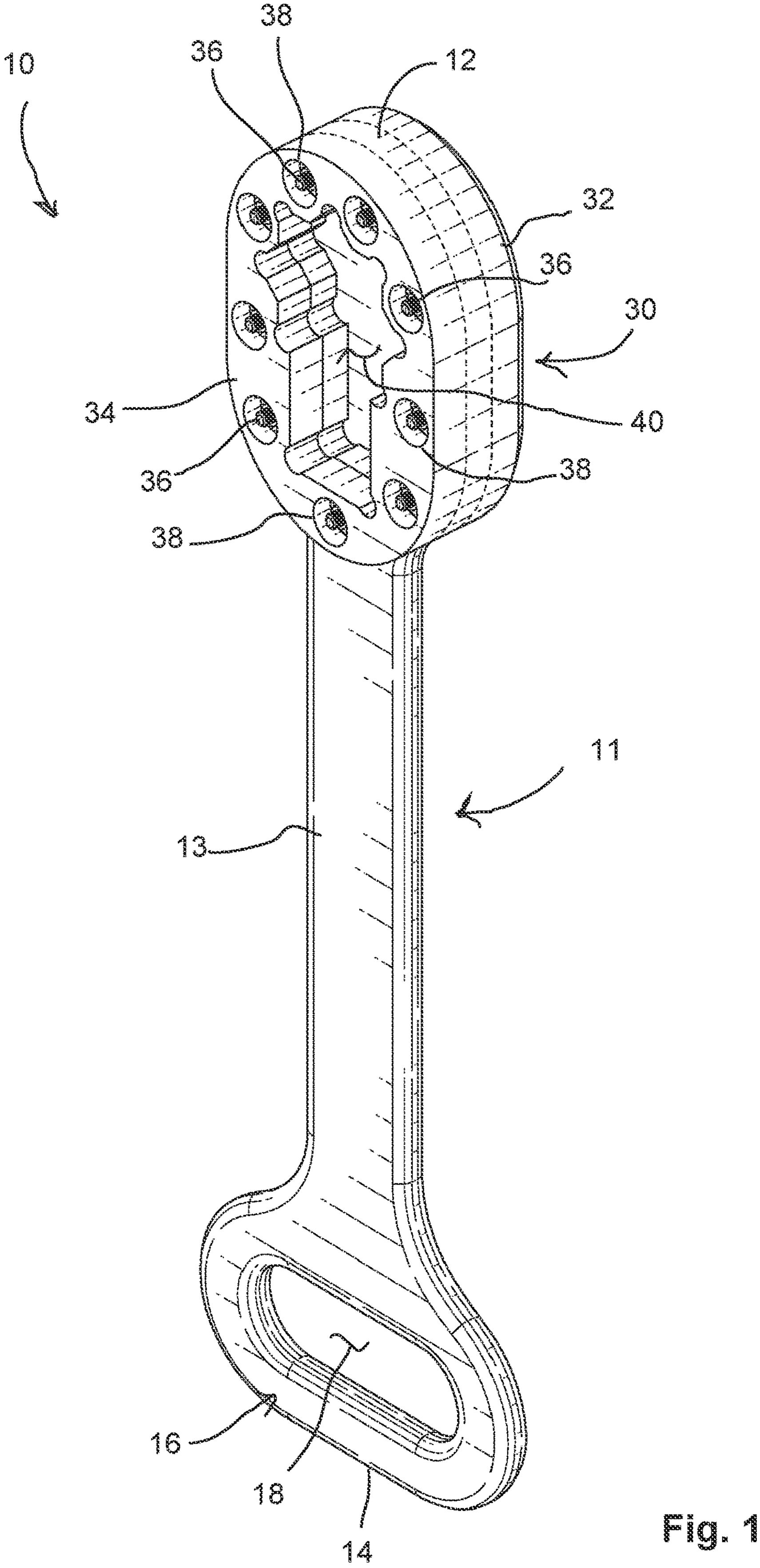
FIG. 1 is a perspective view illustrating an embodiment of stake holding tool according to principle of the present disclosure.

The following description is provided an enabling teaching of embodiments of the present disclosure. Those skilled in the art will recognize that many changes made to the embodiments of the stake holding tool 10 as discussed in the present disclosure, while obtaining beneficial results. It further will be apparent that the embodiments of a stake holding tool as described herein can be modified or changed by selecting some of the features of the embodiments without utilizing other features. Accordingly, those skilled in the art will recognize that many modifications and adaptions to the embodiments described herein are possible and may be even be desirable in certain circumstances. Thus, the following description is provided as being illustrative of the principles of embodiments of the present disclosure and not in limitation thereof.

FIGS. 1-4 illustrate embodiments of a stake holding tool 10 configured to enable a worker to hold a stake, post, or other supports (e.g., the stake S shown in FIG. 4) at a desired location along a surface and in a substantially upright orientation for driving of the stake into or through the surface, such into the ground G at a construction site. The term “stake” as used herein can refer to and encompass a variety of supporting members, including, but not limited to, wooden stakes such as used for silt fencing, netting, etc., wood, metal or plastic posts for other types of fencing such as chain-link fences, and various other types of supports for other applications such as supporting timbers or the like used for erecting concrete forms, platforms, walkways or other structures. The stake holding tool 10 is configured to enable a worker to hold the stake S in a substantially secure position and orientation (e.g., in a substantially vertical or upright orientation) while the worker is able to maintain a safe distance from the stake as the stake is driven into the ground G, etc. either by the worker themselves or by another worker who can hold the stake S as the first worker drives it into the ground G.

In one embodiment, as illustrated in FIGS. 1-3A, the stake holding tool 10 is configured with an elongated body 11 that generally will be formed from a substantially rigid, durable material such as steel or similar metal, or various synthetic or plastic materials; for example, by being molded (such as by injection molding), cast or otherwise formed. Other materials, including wood, also can be used. The body further can be formed with a substantially skeletonized construction with a first end 12, an intermediate section 13, and a second end 14. The first and second ends 12, 14 can be formed as having an expanded width, as indicated in FIGS. 2A and 2B, with the intermediate section 13 made with a reduced width or thickness. As a result, the stake holding tool 10 can be configured with an extended length body that can formed from a high strength, rigid, and durable material sufficient to absorb impacts, while the weight of the stake holding tool also can be substantially minimized so as to enable easy use, such as by a single worker holding the stake holding tool 10 by one hand for holding a stake S as the stake is being driven into the ground G.

Figure 2A:
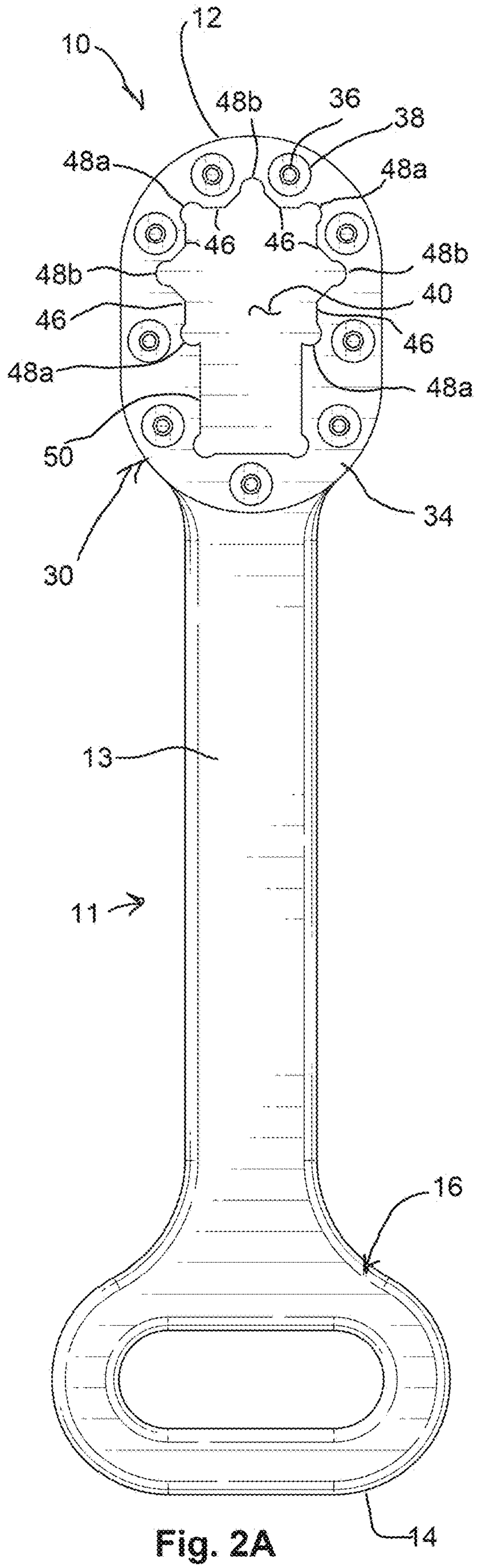
FIGS. 2A and 2B are bottom plan and top plan views, respectively, of the stake holding tool according to principles of the present disclosure.
Figure 2B:
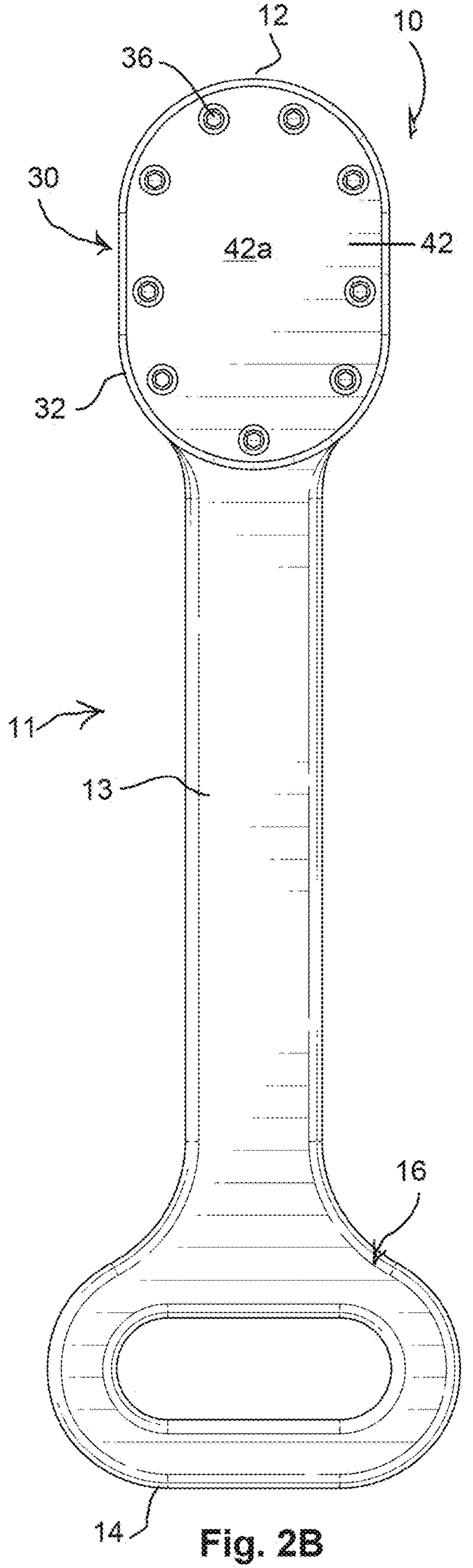

As further illustrated in FIGS. 2A and 2B, the first end 12 of the body 11 can be formed with an elongated, generally oval or substantially circular configuration that extends outwardly from a neck portion of the intermediate section to an expanded diameter. Various other shapes or configurations also can be used. The opposite, second end 14 of the body 11 of the stake holding tool 10 also can be formed with an expanded width or diameter, and in some embodiments, can define a gripping or hand hold area 16. For example, as indicated in FIGS. 1-2B, the second end of the body can be configured with an opening 18 formed therein and which defines a handhold whereby a worker can grasp the stake holding tool 10 and hold it securely during use.

In embodiments, the elongated body of the stake holding tool 10 can be formed with various desired lengths. For example, in some embodiments, the stake holding tool 10 can have a length of approximately one foot to approximately three feet in length, while in other embodiments, the stake holding tool can have a length of approximately 6 inches-3 feet, 6 inches-2.5 feet, 6 inches-2 feet, 6 inches-1.5 feet, 6 inches-1 foot, 1 foot-2.5 feet, 1 foot-2 feet, 1 foot-1.5 feet, 1.5 feet-3 feet, 1.5 feet-2.5 feet, 1.5 feet-2 feet, 2 feet-3 feet, 2 feet-2.5 feet, 2.5 feet-3 feet, or combinations thereof. Other, varying lengths also can be used.

In addition as noted, the intermediate section of the body of the stake holding tool can have a reduced width and/or thickness; for example, having a width of between approximately 0.75-3 inches and in some embodiments, 0.75-2.5 inches, 0.75-2.25 inches, 0.75-2 inches, 0.75-1.75 inches, 0.75 inches-1.5 inches, 0.75 inches-1.25 inches, 0.75-1.0 inches, 1.0 inches-3 inches, 1.0 inches-2.75 inches, 1.0 inches-2.5 inches, 1.0 inches-2.25 inches, 1.0 inches-2 inches, 1.0 inches-1.75 inches, 1.0 inches-1.5 inches, 1.0 inches-1.25 inches, 1.25 inches-3 inches, 1.25 inches-2.75 inches, 1.25 inches-2.5 inches, 1.25 inches-2.25 inches, 1.25 inches-2 inches, and a thickness of about 0.25 inches-0.75 inches, 0.25 inches-0.5 inches, 0.5 inches-1 inch, 0.5 inches-0.75 inches. Other widths and thicknesses also can be used.

Figure 4:
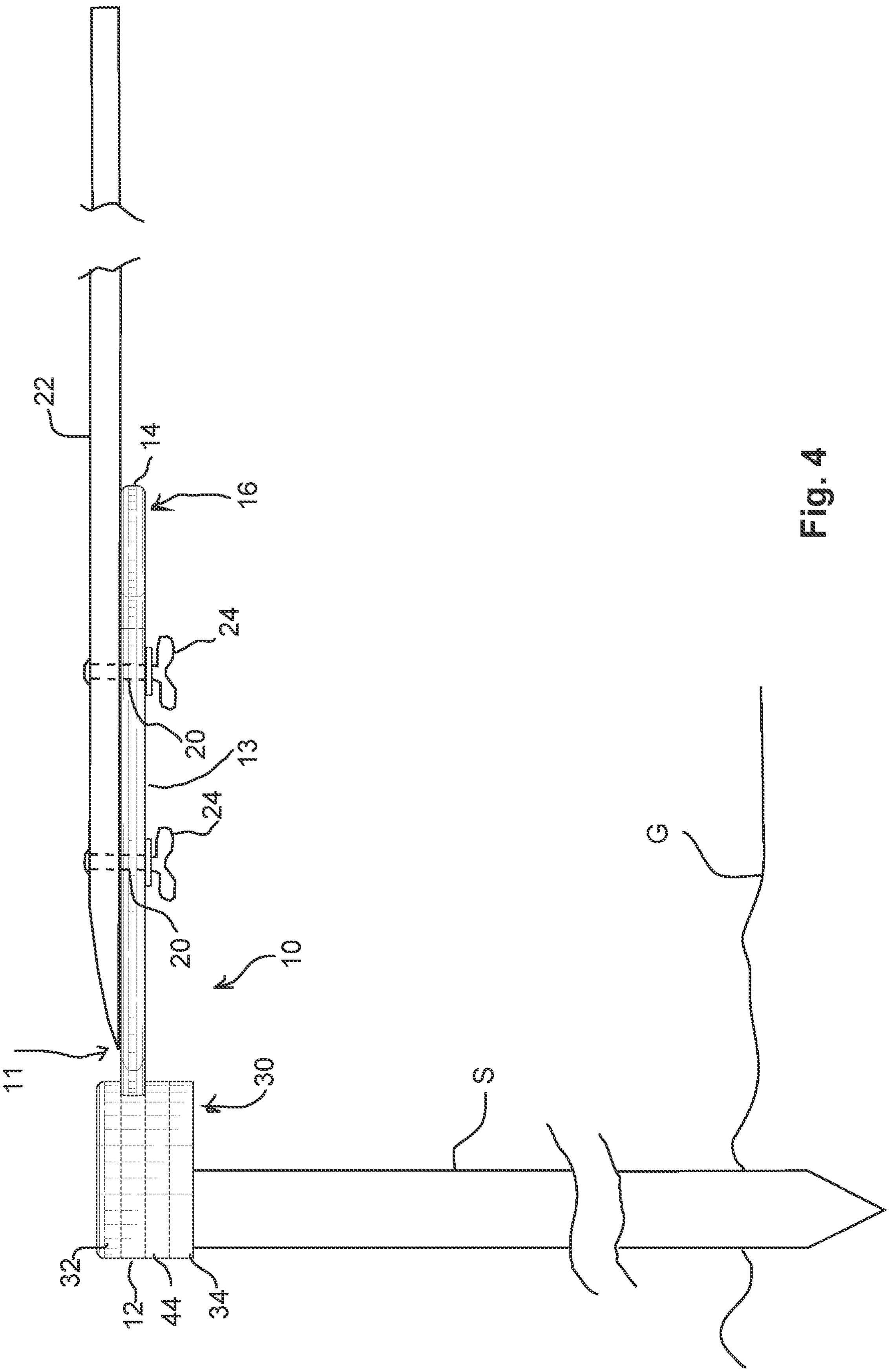
FIG. 4 illustrates an example installation of a stake or post using a stake holding tool such as in FIGS. 1-3B.

The stake holding tool 10 further can be configured to be extensible so as to further elongate or shorten the distance between the first and second ends 12, 14 thereof coming upon the acquired use. For example, in some embodiments, such as shown in FIG. 4, the stake holding tool 10 can include a series of fastener openings 20 defined along the intermediate section 13 of the body 11. A separate handle or extension piece 22 can be secured to the intermediate section, e.g., by one or more fasteners 24 inserted through an end of the extension piece or handle 22 and through the fastener openings 20. The fasteners 24 can be secured with removable nuts, such as wing nuts, etc. to enable ease of removal and/or attachment of the handle or extension piece 22 to the body 11 of the stake holding tool 10. Alternatively, other suitable fasteners also can be used.

In other embodiments, the body 11 of the stake holding tool 10 can be made to extend or can include sections that can be coupled together and secured, such as by fasteners, to extend or adjust the length of the intermediate section of the body as needed. The extension of the stake holding tool 10, either by securing a handle or extension piece 22 thereto, or by extension of the body 11, generally will be accomplished in a manner to enable the extension of the stake holding tool so that it can be extended to desired lengths, while remaining easy to handle, and without causing undue torque to be created when the stake holding tool 10 is struck for driving a stake S into the ground G.

Figure 3A:
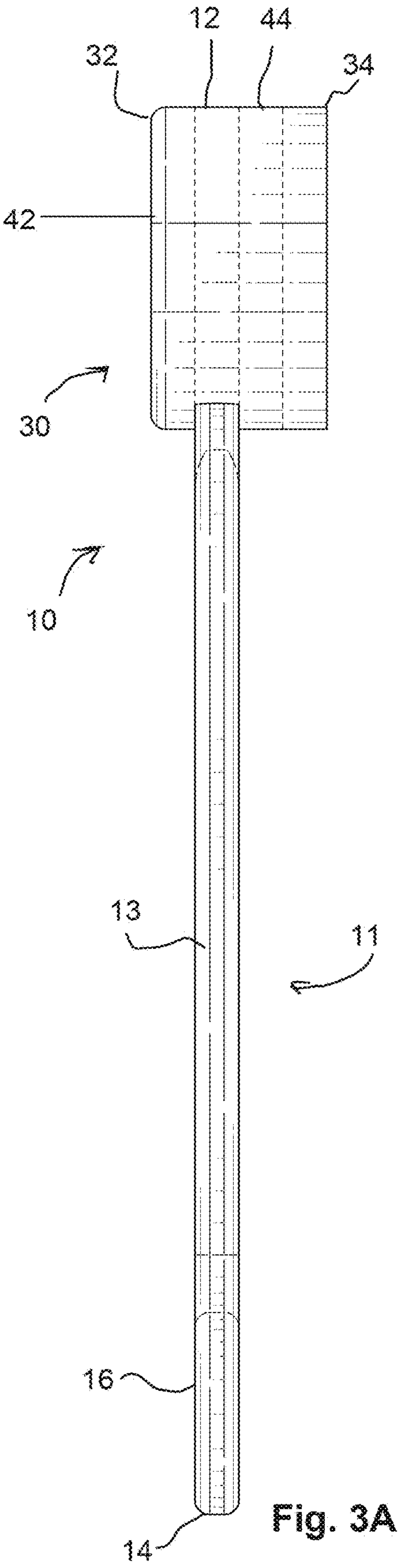
FIGS. 3A and 3B are side elevation views illustrating the stake holding tool of FIGS. 1-2B according to embodiments of the present disclosure.
Figure 3B:
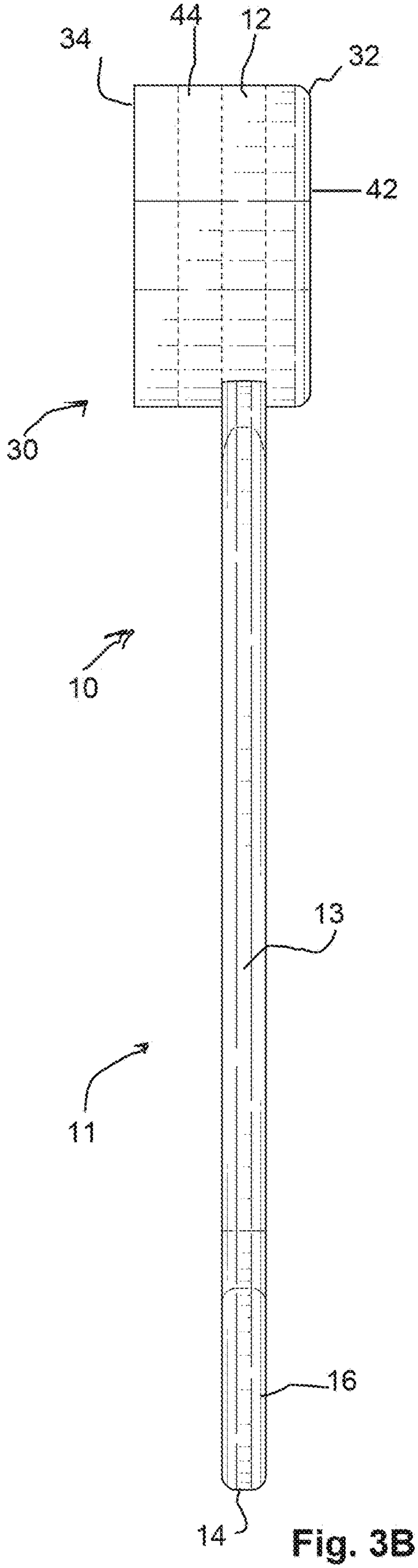

As illustrated in FIGS. 1 and 3A-3B, a head portion 30 generally will be defined at the first end 12 of the elongated body 11 of the stake holding tool 10, and generally will fit over the first end of the body 11, overlapping and projecting wider from the intermediate section 13 thereof. In embodiments, the head portion 30 can be formed from one or more sections or parts mounted to the first end of the of the stake holding tool body. For example, in embodiments, the head portion 30 can include a striking section 32 and a socket section 34 that will be mounted on opposite sides of the first end 12 of the body 11 and can be secured to each other, with the first end 12 of the elongated body 11 sandwiched therebetween. In some embodiments, the socket section 34 can be formed as a part of or otherwise integrated with the first end of the elongated body, with the striking section mounted thereto.

The striking and socket sections 32, 34 can be secured to each other by a series of fasteners 36 (FIGS. 1-2A) that can extend through fastener openings 38 (FIG. 1) formed in the socket and striking sections 32, 34, and through the first end 12 of the elongated body 11. Various types of removable fasteners can be used. As shown in FIGS. 1 and 2A, the socket section 34 and the first end 12 of the elongate body 11 can at least partially define a stake receiving recess 40 described in more detail below. Further, as shown in FIGS. 1-2B, the strike plate 32 is configured to cover/close off the stake receiving recess 40 and to provide a strike surface 42 (FIG. 3B).

In addition, as illustrated in FIG. 3B, each of the striking and socket sections 32, 34 can be formed from one or more plates, including a strike plate 42 and at least one socket plate or piece, and with additional plates or spacers 44 being mountable between the striking and socket sections 32, 34 and the first end 12 of the elongated body 11 so as to expand the head portion 30. For example, one or more additional spacers 44 can be added between the first end 12 of the body 11 and a lower plate or portion of the strike plate of the striking section 32. The spacers will have an opening or recess of a configuration generally corresponding to the configuration of the stake receiving recess of the socket section to extend the length of the stake receiving recess 40 defined within the socket section 34 and the first end 12 of the elongated body 11. For example, each of the socket section 34, the first end 12, and the spacer 44 can include respective cutouts that cooperate and/or align to define the stake receiving recess 40. Depending upon the type of material being driven, it may be necessary to extend the stake receiving recess 44 defined within the socket portion 34 and the first end 12 of the elongate body 11 to deter damage or breakage due to shock or impact when the stake S is being driven into the ground G. While one additional spacer 44 is shown in FIGS. 3A and 3B, any suitable number of additional spacers 44 could be used.

Figure 2C:
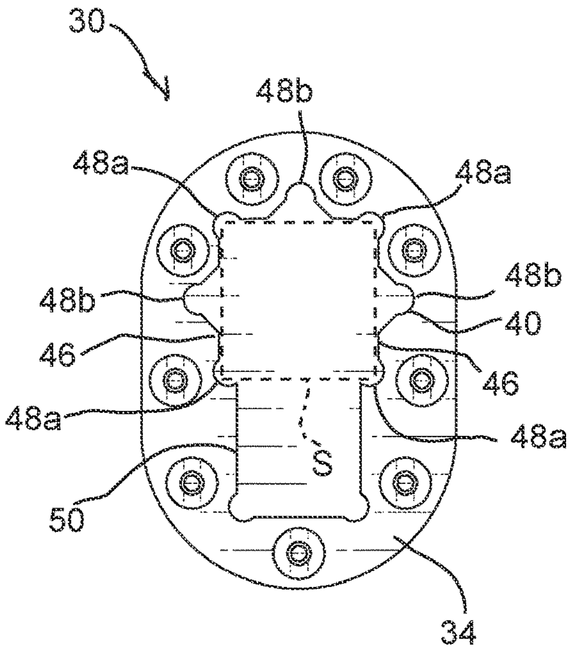
FIGS. 2C-2E are bottom plan views of a head portion of the stake holding tool of FIG. 2A schematically showing different configurations and/or cross-sectional shapes of stakes received in a stake receiving recess of the stake holding tool.
Figure 2D:
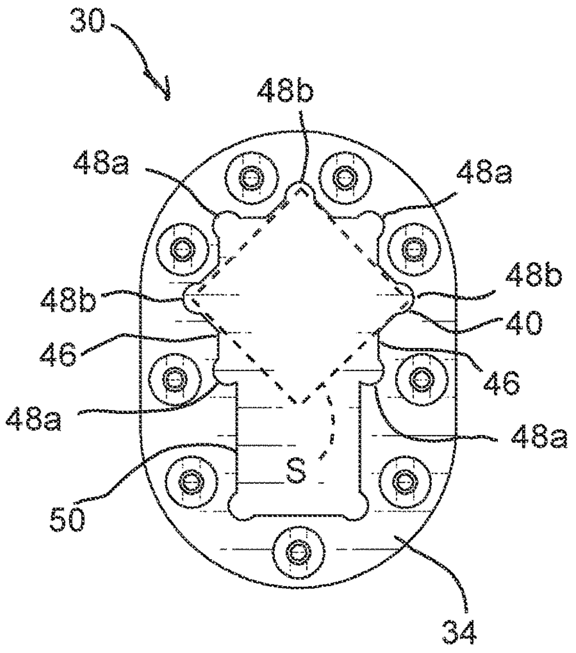
Figure 2E:
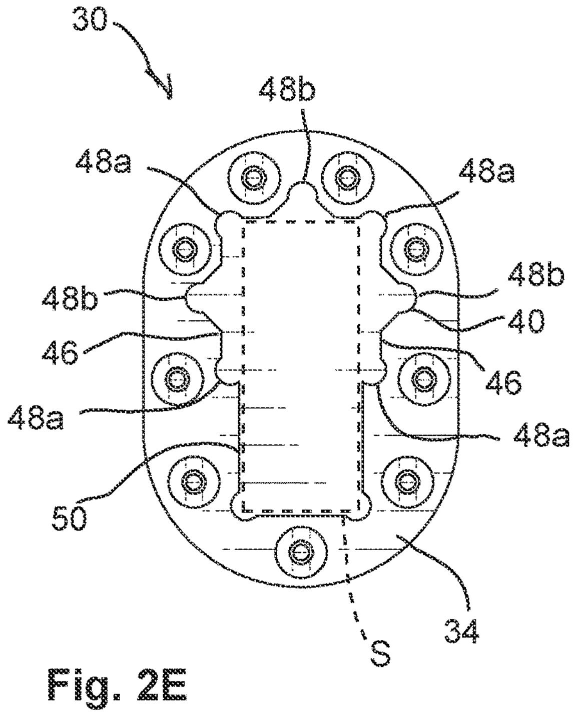

As further illustrated in FIGS. 1 and 2A, the stake receiving recess 40 formed within the socket section generally will include a series of projections 46 and recesses 48*a*, 48*b* formed in spaced series about at least a portion of an opening defining the stake receiving recess 40. The projections 46 and recesses 48*a*, 48*b* generally will be configured to enable the receipt of stakes S having various sizes and configurations, as indicated in FIGS. 2C-2E, enabling end portions of such stakes S to be engaged or captured within the recess 40 such that the stakes will be held in a secure engagement as they are struck or driven into the ground G. In embodiments, stakes S having different configurations can be construed as having different cross-sections, orientations, different sizes, different shapes, etc.

In an exemplary embodiment, the corners of a stake S with a square cross-section can be received in the recesses 48*a* (e.g., as schematically shown in FIG. 2C) or the recesses 48*b* (e.g., as schematically shown in FIG. 2D). Alternatively, the cross-section of the stake S could have more or fewer than 4 corners that engage any suitable combinations of the recesses 48*a*, 48*b*. The stake receiving recess 40, in some embodiments, further can include a substantially straight section 50 as needed to enable receipt of certain size or shape post, such as metal post having base or body section with outwardly flaring edges or projections. Alternatively, the straight section 50 can cooperate with the portion of the stake receiving recess 40 with the projections 46 and recesses 48*a*, 48*b* to receive a stake S with a rectangular cross-section (e.g. a 2×4, 4×4 or other size post or supporting member). For example, as schematically shown in FIG. 2E, a stake with a rectangular cross-section can be received in the straight section 50 and the recesses 48*a* at the opposite end of the head portion 30 from the straight section 50.

The opening of stake holding recess 40 generally will be adapted to receive stakes or posts having a width or cross-section of approximately 2 inches by 2 inches, with an overlapping opening of approximately 1.0 inches-3.75 inches. and further can be configured to accommodate larger or smaller sizes of stakes. In non-limiting embodiments, different size and/or configuration socket and striking sections can be provided, including stake holding recesses having selected depths and openings of selected sizes and/or configurations, which socket and/or striking sections can be interchanged in the field to address different applications. For example, for installation of stakes for silt fencing or similar size stakes, a socket section with a smaller stake holding recess that enables a closer engagement/fit of the stake holding tool with the stake can be used; while for other applications/uses such as driving larger fence posts, supports for concrete forms, walkways, etc., and/or other applications that require larger size stakes or posts (e.g. 2×4, 4×4 or larger) a larger size striking section and larger size socket section having an expanded size the stake holding recess can be substituted for smaller size socket and striking sections. Such substitutions or changing of the striking and socket sections can be done by workers in the field by removal of the fasteners 36, swapping the existing striking and/or socket sections with new striking and/or socket sections and reinserting the fasteners to couple the new striking and socket sections to the body. It will further be understood that, depending on the application, only the striking section can be changed (e.g. to replace or change-out a worn or damaged strike plate, to change to a different material strike plate, or a different size strike plate), only the socket section can be changed (e.g. to replace or change-out a worn or damaged socket section or to change sizes of the stake receiving recess), in addition to enabling a change-out of both the striking section and socket section.

In embodiments, the stake holding recess can be configured to accommodate various shapes of stakes (e.g. square, rectangular, circular, triangular, star-shaped, etc.) and a range of sizes of stakes, for example, and without limitation, sizes ranging from about 0.5 inches by 0.5 to 2 inches, 1 inch by 1 to 2 inches, 1 inch by 2.5 to 4 inches, 1.5 inches by 1.5 to 4 inches, 2 inches by 2 to 4 inches, as well as stakes with sizes up to about 4 inch by 4 inch or larger. As noted, in embodiments, other size openings also can be provided. In addition, in various embodiments, the stake holding recess can have a depth that can range from approximately 0.5-1 inch to approximately 3-6 inches, although greater or lesser depths can also be used. The depth of the stake holding recess also can be varied by use of additional or fewer spacer plates 44 inserted between the first end 12 of the elongated body 11 and the striking plate 32, and, in addition or in the alternative, between the first end of the elongated body and the socket section 34.

As illustrated in FIG. 2B, the striking section 32 of the stake holding tool 10 generally will include at least one strike plate 42 configured to substantially align with the first end of the body, with a size, e.g. a width greater than the intermediate section 13 of the elongated body 11 of the stake holding tool 10. The configuration of the striking section generally will align with that of the socket section 34 and the first end 12 of the body, so that the edges thereof substantially match up to provide a smooth transition. In embodiments, the striking section further can comprise one or more replaceable and/or interchangeable strike plates 42, as indicated in FIG. 3B. As further illustrated in FIG. 3B, the strike plate 42 will include a striking surface 42*a* can be attached to the first end 12 of the elongated body 11 as indicated in FIGS. 3A-3B. The strike plate can have a recess at least partially formed therein, so as to extend the height of the stake holding recess. The upper surface of the strike plate 42 can further include an insert formed of a resilient material, and defines the striking surface 42*a* adapted to be struck or impacted by a driving tool such as a sledge hammer, mallet or other, similar tool. In addition, in embodiments, the strike plate 42 can be configured with a wider and longer shape or configuration to provide an increased striking surface as needed.

As shown in FIG. 3B, various additional plates or spacers 44 can be mounted between the strike plate and the first end of the elongated body of the stake holding tool. The spacers 44 can be used to extend the height of the striking section, and can include openings with a configuration corresponding to the configuration of the stake holding recess so as to extend the depth of the stake receiving recess. The spacers also can be formed from various resilient, high strength materials to help act as shock absorbing members between the body of the stake holding tool and the strike plate mounted thereover. In use, when a stake S or post is received within the stake holding recess 40 of the first end 12 of the elongated body 11 and of the socket portion 34 and is being held by the stake holding tool 10, the striking portion 32 will bear against the upper end of the stake S or post and will provide shock absorption to deter damage or breakage to the upper end of the stake S or post (e.g., by distributing the striking force over a relatively larger area of the striking surface 42*a* as compared to the end of the stake S or post).

The striking section 32, or at least the upper plate thereof, generally will be formed from a resilient, durable material selected to enable at least some shock absorption; and, in embodiments, metal such as steel, and plastics such as high density polyethylene, rubber or other, similar shock absorbing materials, will be used to form one or more plates of the plates of the striking section 32. In addition, one or more plates of the striking section 32 can be interchanged with other, different material plates, such as, to substitute or provide different materials such as rubber, plastic, etcetera for use in driving stakes S or posts formed from different materials. For example, rubber or plastic materials may be better suited for driving wooden stakes or posts, while strike plates formed from metal materials may be better suited for driving metal stakes or posts. The sandwich construction wherein the socket and striking sections 34, 32 are releasably mountable to the first end 12 of the elongated body 11 of the stake holding tool 10 enables easy change out of different material strike plates in the field. As additionally illustrated in FIG. 2A, the fasteners 36 typically will be recessed (e.g., countersunk) into their fastener openings 38.

In addition, in embodiments, the stake holding tool 10 can be formed as a substantially unitary structure. For example, the body and at least part of the head portion 30 of the stake holding tool can be cast or molded, such as by injection molding. In such an embodiment, the elongated body and socket section can be integrally formed together, with the stake holding recess formed through the socket section and second end and being open at each end. One or more plates defining the striking section also can be integrally formed therewith, and/or can be mounted to the first end of the body. The unitary structure also can include a spacer plate or multiple spacer plates, one or more of which can have a corresponding stake receiving recess formed therein to extend a depth of the stake holding recess and allow more of the top end of a stake or post to be engaged therein. In some embodiments, the striking section, including a strike plate thereof, also can be integrally formed with the first end and socket section of the stake holding tool and can have a removable/replaceable striking surface. Still further, in embodiments, the striking and socket sections and the first end of the stake holding tool can be replaceable as a unit. Moreover, the head portion can be part of an extension piece for extending a length of the stake holding tool.

In embodiments, the at least one of the spacer plates 44 can be formed from a material selected to help absorb or buffer shocks from impact of a hammer, mallet or other driving tool therewith; e.g. where steel/metal stakes or posts are to be driven into the ground, one or more steel or other metal buffering plates can be located between the strike plate and the first end of the body. Other shock absorbing or impact resistant materials, such as rubber, composite or synthetic materials also can be used. The spacer plates can help extend the depth of the stake receiving recess, and can be interchanged as needed depending on the application for the stake holding tool. The strike plate of the striking section likewise is replaceable and can be interchanged with other strike plates, e.g. enabling a change of the strike plate such as for repair or replacement of a worn or damaged striking surface, or to change materials thereof, such as to replace a strike plate with a softer or more resilient striking surface used for driving wooden or plastic posts or stakes for a strike plate and striking surface of a harder material such as steel for use with metal stakes or posts.

As illustrated in FIG. 4, in use, a worker can grasp the second end 14 of the elongated body 11 of the stake holding tool 10, such as by inserting their hand through the hand holding or gripping area 16 at the second end 14 of the body 11, while placing the first end 12 of the body 11 over a top end of a stake S or post. The top or upper end of the stake S or post will be received within the stake holding opening 40 of the socket section 34, generally being secured against rotation by engagement with at least a portion of the projections 46 and recesses 48*a*, 48*b* thereof. Once the stake S is properly positioned at a desired location, it can be held in a substantially upright orientation as the worker stands at a distance spaced away from the stake. Thereafter, the worker going either by themselves, or a second worker, can drive the stake S into the ground G by impacting the strike plate 42 of the striking section with a tool such as a hammer, mallet, sledge hammer, etc. Thus, the stake S or post can be driven firmly in the ground G while the person or worker holding the stake in place can be maintained at a substantially safe distance to substantially avoid injury.

Any of the features of the various embodiments of the disclosure can be combined with replaced by, or otherwise configured with other features of other embodiments of the disclosure without departing from the scope of this disclosure. The configurations and combinations of features described above and shown in the figures are included by way of example.

The present disclosure has been described herein in terms of examples that illustrate principles and aspects of the present disclosure. The skilled artisan will understand, however, that a wide gamut of additions, deletions, and modifications, both subtle and gross, may be made to the presented examples without departing from the spirit and scope of the present disclosure.

The invention claimed is:

1. A stake holding tool, comprising:

an elongated body including a first end, an intermediate section, and a second end having a gripping portion defined therealong; and a head portion coupled to the first end of the body, the head portion having:

a striking section positioned over the first end of the body and including an upper surface of a resilient material; and a socket section coupled to the body opposite the striking portion and comprising a stake holding recess having a series of projections arranged at spaced locations about the stake holding recess, the projections configured to receive different configuration and size stakes therein;

wherein when a portion of a stake is received within the stake holding recess the stake is held and located at a selected distance from the second end of the elongated body.

2. The stake holding tool of claim 1, wherein the striking section comprises at least one strike plate of a selected material releasably coupled to the first end of the body, and wherein the strike plate is replaceable to enable interchanging of different strike plates for use with different material stakes.

3. The stake holding tool of claim 1, wherein the striking section and the socket section each comprise at least one plate releasably attached on opposite sides of the first end of the body.

4. The stake holding tool of claim 1, wherein the intermediate section of the body further comprises a connecting portion configured to connect an extension piece to the second end of the body.

5. The stake holding tool of claim 4, wherein the connecting portion comprises a series of fastener openings configured to receive fasteners therein for connecting the extension piece to the body.

6. The stake holding tool of claim 1, wherein the striking section comprises a removable plate with a striking area defined along the upper surface thereof, and wherein the resilient material comprises metal, rubber, high density polyethylene, or a combination thereof.

7. A stake holding tool, comprising:

an elongated body including at least a first end and an opposing second end spaced a selected distance from the first end by an intermediate portion;

a head portion located at the first end of the body and including a strike plate coupled to the first end; and a stake receiving recess defined in at least the first end opposite the strike plate, the stake receiving recess configured for at least partially receiving an end of a stake, wherein the stake receiving recess includes receiving features that are configured for receiving different configurations of the stakes;

wherein the head portion further comprises a socket section formed at the first end of the body opposite the strike plate;

wherein the strike plate is removably coupled to the first end of the body so as to be replaceable; and wherein the strike plate is replaceable with a strike plate of a different material selected for driving a stake of a selected material.

8. The stake holding tool of claim 7, wherein the head portion further comprises a socket section positioned opposite to the strike plate, and wherein the stake receiving recess is defined in the socket section.

9. The stake holding tool of claim 8, wherein the head portion further comprises at least one spacer coupled to the first end of the elongated body and to the strike plate, and wherein the stake receiving recess is further defined in the spacer so as to extend a depth of the stake receiving recess.

10. The stake holding tool of claim 7, wherein receiving features comprise a series of recesses arranged at spaced locations about the stake holding recess.

11. A method of forming a stake holding tool, the method comprising: obtaining an elongated body including at least a first end and an opposing second end spaced a selected distance from the first end by an intermediate portion; and coupling at least a striking section to the first end of the elongated body to at least partially form a head portion of the stake holding tool; wherein a stake receiving recess is defined in at least the first end for at least partially receiving an end of a stake, wherein the stake receiving recess includes receiving features that are configured for receiving different configurations of the stakes; and placing one or more spacer plates between the first end of the elongated body and the striking section and coupling the striking section to the first end of the elongated with a plurality of fasteners; wherein the one or more spacer plates each include an opening having a configuration substantially similar to the stake receiving recess so as to extend a depth of the stake receiving recess.

12. The method of claim 11, further comprising positioning a socket section opposite to the striking section to further form the head portion of the stake holding tool, wherein the stake receiving recess is further defined in the socket section.

13. The method of claim 11, further comprising coupling at least one spacer to the first end of the elongated body to further form the head portion of the stake holding tool, wherein the stake receiving recess is further defined in the at least one spacer.

14. The method of claim 11, wherein the coupling at least the striking section to the first end of the elongated body comprises removably coupling the striking section to the first end of the elongated body with a plurality of fasteners.

15. The method of claim 11, wherein the striking section comprises a striking surface and is formed from a first material comprising at least one of a metal, composite, synthetic material, high density polyethylene, rubber, or a combination thereof, and further comprising decoupling the striking section and substituting an additional striking section formed from a second selected material, wherein the second material is different from the first material, and wherein the first and second materials are selected for driving stakes of different materials.

* * * * *